United States Patent
Park et al.

(10) Patent No.: US 8,412,243 B2
(45) Date of Patent: Apr. 2, 2013

(54) POWER CONTROL METHOD AND APPARATUS FOR INTER-CELL INTERFERENCE REMOVAL

(75) Inventors: Jisoo Park, Daejeon (KR); Young-il Kim, Daejeon (KR); Yuexing Peng, Beijing (CN); Kan Zheng, Beijing (CN); Wenbo Wang, Beijing (CN)

(73) Assignee: Electronics and Telecommunications Research Institute, Daejeon (KR)

( * ) Notice: Subject to any disclaimer, the term of this patent is extended or adjusted under 35 U.S.C. 154(b) by 509 days.

(21) Appl. No.: 12/630,490

(22) Filed: Dec. 3, 2009

(65) Prior Publication Data

US 2010/0144381 A1 Jun. 10, 2010

(30) Foreign Application Priority Data

Dec. 5, 2008 (KR) .................. 10-2008-0123300
Oct. 14, 2009 (KR) .................. 10-2009-0097915

(51) Int. Cl.
*H04B 15/00* (2006.01)
(52) U.S. Cl. ..... 455/501; 455/522; 455/63.1; 455/67.13
(58) Field of Classification Search .................. 455/522, 455/69, 67.11, 67.13, 452.1, 452.2, 509, 455/63.1, 447, 524, 501; 370/252, 329, 318
See application file for complete search history.

(56) References Cited

U.S. PATENT DOCUMENTS

| | | | |
|---|---|---|---|
| 2007/0025454 A1 | 2/2007 | Jones et al. | |
| 2008/0187065 A1 | 8/2008 | Chang et al. | |
| 2010/0105406 A1* | 4/2010 | Luo et al. | 455/452.2 |
| 2011/0103241 A1* | 5/2011 | Cho et al. | 370/252 |

FOREIGN PATENT DOCUMENTS

| | | |
|---|---|---|
| EP | 0841826 | 5/1998 |
| JP | 10-155181 | 6/1998 |
| JP | 2008-288932 | 11/2008 |
| KR | 10-2008-0014892 | 2/2008 |
| KR | 10-2008-0073801 | 8/2008 |
| KR | 10-2008-0087211 | 10/2008 |

OTHER PUBLICATIONS

Hoon Kim, Youngnam Han, and Jayong Koo, "Optimal Subchannel Allocation Scheme in Multicell OFDMA Systems", IEEE VTC, pp. 1821-1825, vol. 3, May 2004.
Guoqing Li and Hui Liu, "Downlink Radio Resource Allocation for Multi-Cell OFDMA System", IEEE Transactions on Wireless Communications, vol. 5, No. 12, Dec. 2006, pp. 3451-3459.
Saad G. Kiani, Geir E. Oien, and David Gesbert, "Maximizing Multicell Capacity Using Distributed Power Allocation and Scheduling", IEEE WCNC, pp. 1690-1694, Mar. 2007.
Hwawei, "Soft Frequency Reuse Scheme for UTRAN LTE", R1-050507, 3GPP TSG RAN WG1 Meeting #41, Athens, Greece, May 9-13, 2005.

* cited by examiner

*Primary Examiner* — John J Lee
(74) *Attorney, Agent, or Firm* — Staas & Halsey LLP

(57) ABSTRACT

A power control method performs a scheduling on user terminals and then allows the user terminals to calculate power of interference by neighboring sectors, generates interference information to indicate how much the base stations in neighboring sectors, which interfere with each other, reduce transmission power based on the calculated power of interference, and informs a serving base station thereof. The base stations calculate throughput gain and throughput loss based on the interference information, and determine whether the reduction of the transmission power is performed based on the calculated throughput gain and throughput loss.

19 Claims, 12 Drawing Sheets

FIG. 6

| Parameter | Simulation value |
|---|---|
| Carrier frequency/bandwidth | 2.5GHz/10MHz |
| Cellular layout | Hexagonal network, 7 cells, 3 sectors per cell |
| Inter-cell distance | 1500m |
| Total BSTX power (P total) | 40W = 46dBm |
| Maximum sector antenna gain | 17dBi |
| Antenna pattern (horizontal) (For cell of 3 sectors having fixed antenna pattern) | $\theta_{3dB}$ = 70 degree, $A_m$ = 20dB |
| Distance-dependent path loss | PL = 130.62 + 37.6 log10(R) (R in km) |
| Penetration and cable loss | |
| Traffic model | Full queue |
| UT (user terminal) speed of interest | 3km/h |
| Antenna Bore-sight point toward flat side of cell (For cell of 3 sectors having fixed antenna pattern) |  |
| Users uniformly dropped in all cells |  |
| Channel coding | Turbo |
| Modulation and coding scheme | QPSK1/2, QPSK3/4, 16QAM1/2, 16QAM3/4, 64QAM2/3, 64QAM3/4, 64QAM5/6 |
| Target BLER | 0.01 |
| L2S | EESM |
| Channel model | SCM (Spatial correlated channel model) |
| Antenna configuration | SISO |
| Scheduling | RR, PF (T=100) |
| | 0.5dB (0.5 BLER point of minimum MCS) |
| | 2.41dB (0.01 BLER point of minimum MCS) | ions to the rest of the network is "switched off". In addition,
POWER CONTROL METHOD AND APPARATUS FOR INTER-CELL INTERFERENCE REMOVAL

CROSS-REFERENCE TO RELATED APPLICATION

This application claims priority to and the benefit of Korean Patent Application Nos. 10-2008-0123300 and 10-2009-0097915 filed in the Korean Intellectual Property Office on Dec. 5, 2008 and Oct. 14, 2009, the entire contents of which are incorporated herein by reference.

BACKGROUND OF THE INVENTION (a) Field of the Invention

The present invention relates to a method for controlling inter-cell interference, and more specifically, to a method for distributing and performing power control for inter-cell interference removal in a wireless communication system, and an apparatus thereof.

(b) Description of the Related Art

In multipath propagation environments, an orthogonal frequency division multiplexing access (hereinafter referred to as "OFDMA") scheme, which has spectrum efficiency robustness and ability to combat inter-symbol interference (ISI), is considered to be an efficient technology in a future broadband wireless communication system. In an OFDMA-based wireless communication system, inter-carrier interference may be disregarded due to the orthogonality of subcarriers that remove the inter-cell interference.

However, a total bandwidth can be fully reused in all sectors due to a frequency reuse factor (FRF) used for increasing the throughput for the system. In this case, the inter-cell interference is considered to be main interfering source. Therefore, in the wireless communication system for reusing a frequency, the inter-cell interference is a factor limiting the system performance. As a result, the technology for controlling the inter-cell interference is important to improve the system performance, and in particular, can improve the system performance at a cell edge.

Reviewing a general interference controlling technology, it is assumed that a subchannel includes subcarriers that are distributed over total bandwidth and different frequency reuse coefficients are allocated to each subchannel. Therefore, a data ratio, which can be obtained by a user in a specific subchannel, is changed based on the frequency reuse factors due to the interference that averages the effect of frequency diversity. In this case, the frequency reuse factor allocation information on all the subchannels is collected and the interference control among all cells is performed based on the collected information. However, there is a problem in that the fact that the subchannels assumed in the control technology include the distributed subcarriers is invalid in a practical system.

As another interference control technology, there is a semi-distributed scheme that is configured of two levels of a resource allocation process, which is performed in a radio network controller (RNC) and a base station, respectively, with different time scales. The radio network controller determines an optimal combination of the user and the radio channel in the multi-cell environments under the assumption that there is only dominant interference and the base station performs the actual user selection based on a short term instantaneous channel gain. However, this scheme has a problem in that there is no fairness to the users.

As another technology, there is a fully distributed scheme that is different from the semi-distributed scheme. In this scheme, the transmission in cells that do not fully contribute capacity to outweigh the interference degradation caused by them to the rest of the network is "switched off". In addition, even though there are several assumptions that lead to a simplified switch-off threshold value, the interference is not effectively removed when there area large number of user terminals.

As such, the existing technologies can maximize the overall throughput for the system but do not guarantee the performance of the cell edge users. In particular, in order to improve the overall throughput, the throughput for the cell edge users is disregarded.

In a wireless communication system providing ubiquitous cell coverage, it is very important to guarantee the throughput for the cell edge users. As interference control technologies considering the performance of the cell edge users, there are an interference randomization scheme, an interference cancellation scheme, and an interference control scheme that use soft frequency reuse, fractional frequency reuse, etc.

However, these schemes improve the performance of the cell edge users through the performance degradation of the user at the cell center and do not guarantee the transmission rate of the cell edge users.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for controlling power and that is capable of effectively removing inter-cell interference in a wireless communication system.

In addition, the present invention has been made in an effort to provide a method and apparatus for controlling power and that is capable of securing transmission rate of cell edge users in a wireless communication system.

An exemplary embodiment of the present invention provides a power control method for inter-cell interference removal. The power control method of signals transmitted from base stations by user terminals in a multi-cell environment that includes a plurality of cells each of which is divided into a plurality of sectors, includes: receiving interference information from a user terminal, the interference information including information that is calculated based on power of interference by an neighboring sector to indicate how much a base station in an neighboring sector, which interferes with each other, reduces transmission power; transmitting the received interference information to the corresponding neighboring sector; and when receiving interference information from the neighboring sector, controlling power of a signal transmitted to the user terminal based on the interference information.

Another exemplary embodiment of the present invention provides a power control method for inter-cell interference removal. The power control method of signals transmitted from base stations by user terminals in a multi-cell environment that includes a plurality of cells each of which is divided into a plurality of sectors, includes: calculating a signal to interference and noise ratio of signals received from a base station of an adjacent sector by the user terminal; calculating arrival power to be reduced based on the calculated signal to interference and noise ratio so that the interference power of the interference signal arrives at the set target signal to interference and noise ratio; generating the interference information that indicates how much the base station in the neighboring sector corresponding to the interference signal reduce the transmission power, based on the calculated arrival power; and transmitting the interference information to a serving base station.

Yet another exemplary embodiment of the present invention provides a power control apparatus for inter-cell interference removal. The power control apparatus of signals of the base station transmitted to user terminals in a multi-cell environment that includes a plurality of cells each of which is divided into a plurality of sectors, includes:

an interference information receiver that receives interference information from a user terminal or an neighboring sector, the interference information including the power scaling ratio that is calculated based on power of interference by the neighboring sector to indicate how much a base station in an neighboring sector, which interferes with each other, reduces transmission power; an interference information transmitter that transmits the interference information received from the user terminal to the corresponding neighboring sector; a power scaling ratio calculator that calculates throughput gain and throughput loss, respectively, based on the power scaling ratio received from the neighboring sector, and determines whether the signal power is controlled based on the calculated throughput gain and throughput loss; and a power controller that reduces the signal power based on the power scaling ratio if it is determined that the signal power is controlled.

Still yet another exemplary embodiment of the present invention provides a power control apparatus for inter-cell interference removal. The power control apparatus of user terminals to control power of signals transmitted by base stations in a multi-cell environment that includes a plurality of cells each of which is divided into a plurality of sectors, includes: a signal to interference and noise ratio calculator that calculates a signal to interference and noise ratio of a signal received from a base station; a power scaling ratio calculator that determines the interference signal based on the calculated signal to interference and noise ratio and calculates a power scaling ratio that indicates how much the base stations in an neighboring sector corresponding to the interference signal reduce the transmission power; and an interference information transmitter that transmits the interference information including the calculated power scaling ratio and the IDs of the corresponding neighboring sector to a serving base station.

BRIEF DESCRIPTION OF THE DRAWINGS

FIG. 6 is a diagram showing parameters according to simulation environments to which the power control method according to the exemplary embodiment of the present invention is applied;

DETAILED DESCRIPTION OF THE EMBODIMENTS

Figure 1:
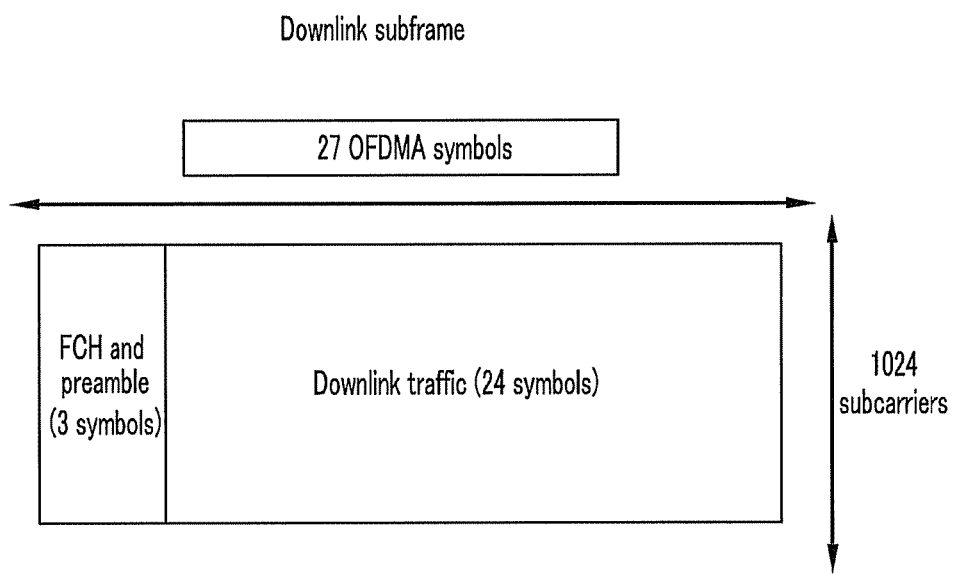
FIG. 1 is a diagram showing an example of a downlink subframe according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements.

In this specification, a user terminal (UT) may designate a mobile station (MS), a terminal, a mobile terminal (MT), a subscriber station (SS), a portable subscriber station (PSS), user equipment (UE), an access terminal (AT), etc., and may include functions of all or a part of the mobile terminal, the subscriber station, the portable subscriber substation, the user equipment, etc.

In this specification, a base station (BS) may designate an access point (AP), a radio access station (RAS), a node B, a base transceiver station (BTS), a mobile multihop relay (MMR)-BS, etc., and may include functions of all or a part of the access point, the radio access station, the node B. the base transceiver station, the MMR-BS, etc.

Hereinafter, an exemplary embodiment of the present invention will be described with reference to the accompanying drawings.

A wireless communication environment according to an exemplary embodiment of the present invention is a multi-cell environment that includes a plurality of cells each of which is divided into a plurality of sectors. In this environment, transmission power of neighboring sectors is controlled based on a gain-and-cost analysis in a downlink to perform an inter-cell interference control.

FIG. 1 is an example that shows a structure of a downlink subframe according to an exemplary embodiment of the present invention.

As shown in FIG. 1, the downlink subframe according to the exemplary embodiment of the present invention may include 27 OFDMA symbols. Herein, the first 3 symbols are preambles and frame control headers (FCHs), and the remaining symbols are data symbols that include data subcarriers and pilot subcarriers.

The data symbols includes 18 adjacent subcarriers in a frequency domain and 6 adjacent symbols in a time domain, which are a basic transmission unit. The basic transmission unit is referred to as a resource unit (RU).

Resource allocations for each user, that is, scheduling and power allocation, are performed in the resource unit (RU). A power control method according to the exemplary embodiment of the present invention is subject to user scheduling and then performed.

In detail, a bandwidth to be used to transmit an uplink traffic burst for each user terminal and the user scheduling allocating a modulation and coding scheme are performed. The user scheduling is performed in each resource unit, and the same power, that is, the power resource allocation, can be performed in each resource unit. A round robin (PR) scheduling scheme, a proportional fairness (PF) scheduling scheme, etc., which allocate the same time interval to all users, may be used, but other scheduling schemes that can be used by those skilled in the art can also be used.

The user scheduling is performed and then the transmission power controlling process is performed based on information provided from the user terminal according to the exemplary embodiment of the present invention. In the power controlling process, it is assumed that pilots of different sectors have orthogonality with respect to each other. In particular, each user terminal calculates power of interference by neighboring sectors and informs how much the base stations in neighboring sectors, which interfere with each other, reduce the transmission power based on the calculated power of interference to a base station in a sector to which the user terminal belongs, that is, a serving base station. The serving base station reports information provided from the user terminal to the adjacent base stations, which interfere with each other, and the base station considers a tradeoff of throughput at a cell edge and the total throughput and determines whether the limitation of the transmission power is accepted.

The power control method for the inter-cell interference removal according to the exemplary embodiment of the present invention will new be described in detail.

Cell edge users (CEUs) are defined as those who cannot be guaranteed the basic data transmission even at the modulation and coding scheme (MCS) having the lowest level.

For this purpose, a threshold SINR $\gamma_{th}$ of a signal to interference and noise ratio (hereinafter, referred to as SINR) is determined, which is used to distinguish the cell edge users from other users.

Each user terminal calculates the SINR for signals received from the base stations, and when the calculated SINR is smaller than the threshold SINR $\gamma_{th}$, the corresponding user terminal is classified as a CEU. Meanwhile, the target SINR is determined for each user terminal, and for convenience of explanation, the target SINR is referred to as $\gamma_{target}$. The target SINR may be set to satisfy the MCS having the lowest level. The code rate and modulation schemes are changed according to the level of MCS. For example, the lower the level, the lower the code rate becomes.

The threshold SINR and the target SINR satisfy the following relation.

$$\gamma_{target} > \gamma_{th} \quad \text{[Equation 1]}$$

The power control method according to the exemplary embodiment of the present invention reduces the interference power so that the SINR at the user terminal reaches the target SINR $\gamma_{target}$.

Figure 2:
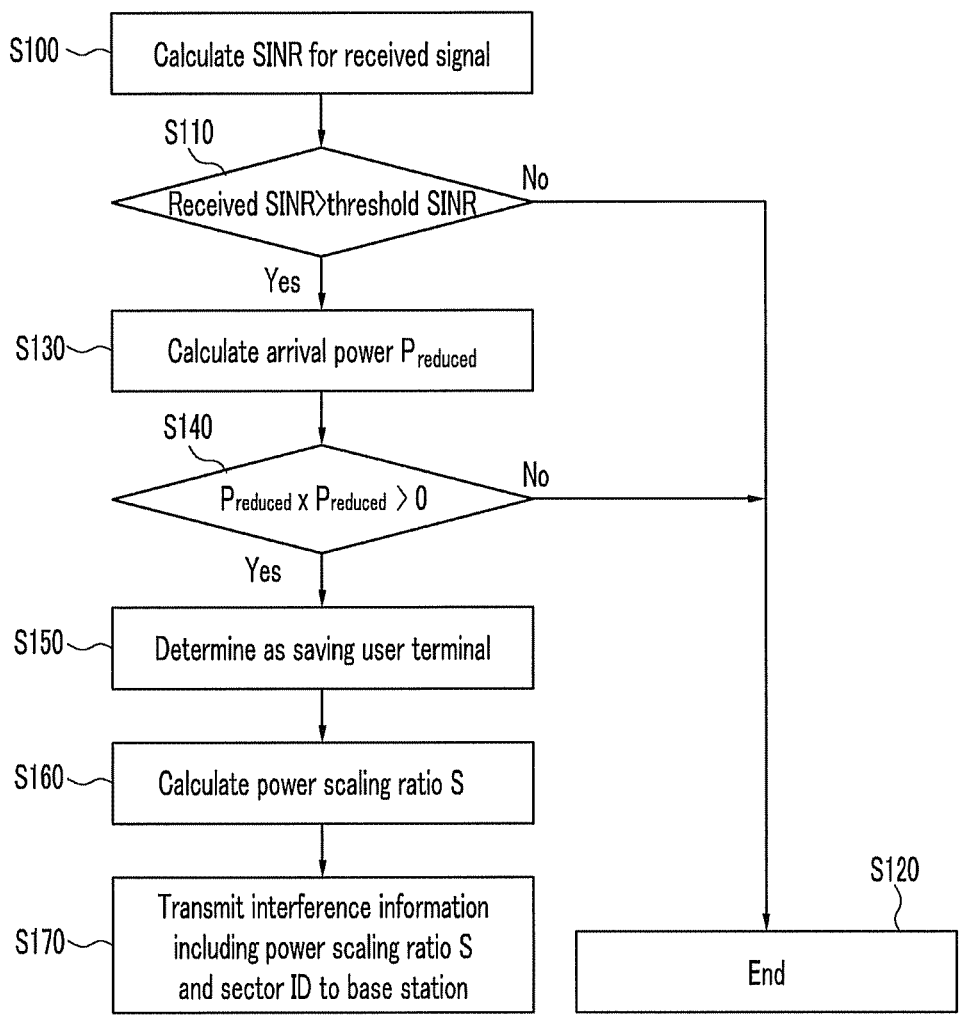
FIG. 2 is a flowchart showing a power control method according to the exemplary embodiment of the present invention, which is performed in a user terminal.
Figure 3:
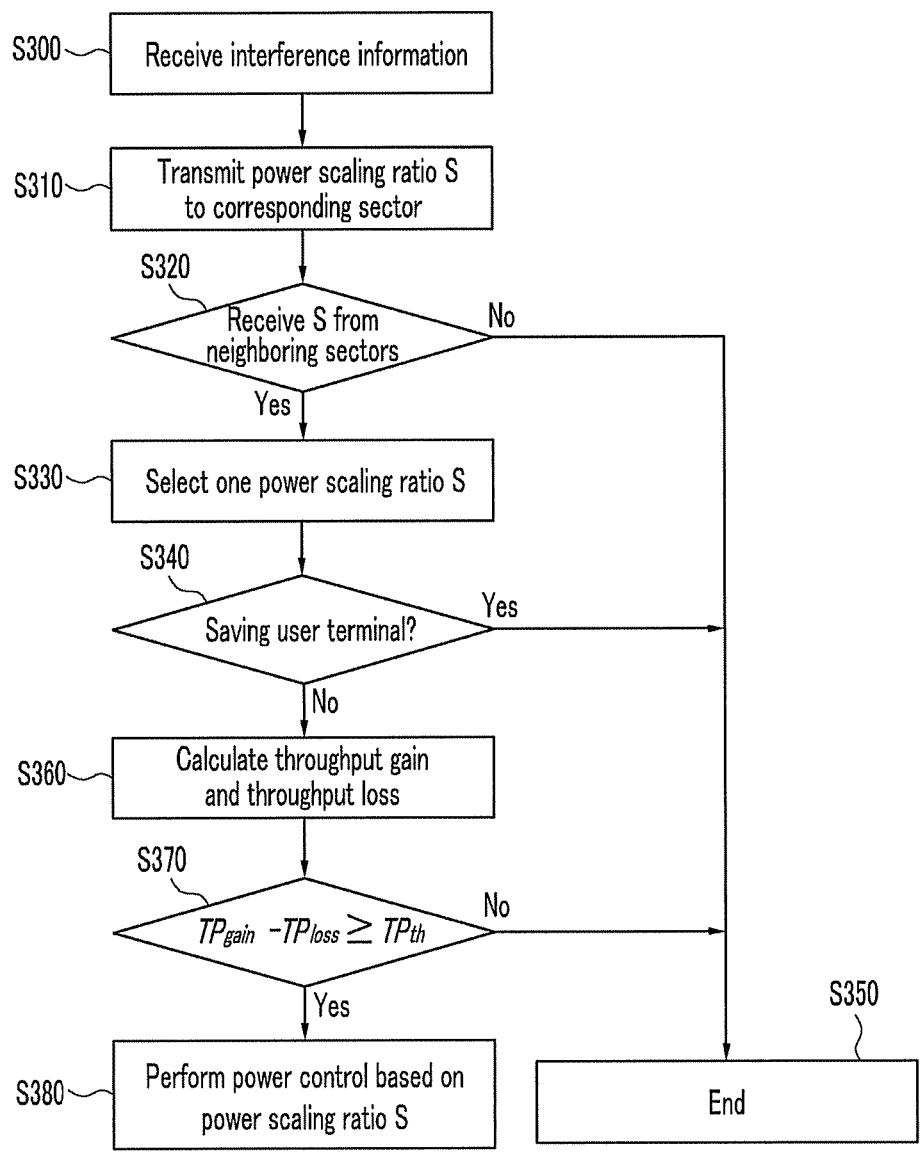
FIG. 3 is a flowchart showing a power control method according to the exemplary embodiment of the present invention, which is performed in a base station.

FIGS. 2 and 3 are flowcharts of the power control method according to the exemplary embodiment of the present invention, and in particular, FIG. 2 is a diagram showing a process that is performed in the user terminal and FIG. 3 is a diagram showing a process that is performed in the base station.

First, as shown in FIG. 2, after scheduling of user terminals is performed, the user terminal communicating with an s-th base station $BS_s$ calculates the SINR of the received signal (S100). Herein, the SINR can be represented as follows.

$$\gamma = \frac{P_s \cdot h_s}{\sum_{i \neq s} P_i \cdot h_i + N_0} = \frac{P_s \cdot h_s}{\sum_{i \neq s,k} P_i \cdot h_i + P_k \cdot h_k + N_0} \quad \text{[Equation 2]}$$

where $P_s$ is the signal power being transmission power of the s-th base station $BS_s$, $P_k$ is dominant interference power, and $P_i$ represents other interference powers. $P_s h_s$ represents signal strength received by the user terminal from the s-th base station $BS_s$ having $P_s$, and $h_s$ represents a channel gain between the user terminal and the s-th base station $BS_s$.

The user terminal compares the SINR of the received signal with the threshold SINR (S110), and when the SINR of the received signal is smaller than the threshold SINR $\gamma_{th}$, the following process is performed, and when the SINR of the received signal is equal to or larger than the threshold SINR $\gamma_{th}$, the following operation is not performed (S120).

When the SINR of the received signal is smaller than the threshold $\gamma_{th}$, the user terminal calculates arrival power $P_{reduced}$ (S130).

In order to reach the target SINR $\gamma_{target}$, the dominant interference power $P_k$ at the receiving side (user terminal) should be reduced. At this time, the arrival power $P_{reduced}$ may be represented as follows.

The arrival power $P_{reduced}$ represents the power to which the dominant interference power $P_k$ is reduced, in order to reach the target SINR $\gamma_{target}$.

$$P_{reduced} = \left[ \frac{P_s \cdot h_s}{\gamma_{target}} - \sum_{i \neq s,k} P_i \cdot h_i - N_0 \right]^+ \quad \text{[Equation 3]}$$

where "+" represents an operation of setting a negative value to "0".

When the arrival power $P_{reduced}$ is "0", by only reducing the dominant interference power $P_k$, it is impossible to reach the target SINR $\gamma_{target}$. In the exemplary embodiment of the present invention, the user terminal, which is in this condition, is referred to as a "worst user terminal". A separate power control is not performed on the worst user terminal.

Meanwhile, when the arrival power $P_{reduced}$ is larger than "0", the arrival power $P_{reduced}$ becomes the dominant interference power for the corresponding user terminal. The arrival power becomes the required dominant interference power for the user terminal to reach the target SINR $\gamma_{target}$. The user terminal, which is in this condition, is referred to as a "saving user terminal".

As such, in the exemplary embodiment of the present invention, the user terminals are classified into the worst user terminal and the saving user terminal, and the power control is performed on the saving user terminal to suppress the inter-cell interference.

The user terminal calculates the arrival power $P_{reduced}$, which is the dominant interference power $P_k$ that should be reduced in order to reach the target SINR $\gamma_{target}$, and determines whether the product of the calculated arrival power $P_{reduced}$ is larger than "0" (S140). In other words, when satisfying a condition of $P_{reduced} \cdot P_{reduced} > 0$, it is determined that the user terminal is the saving user terminal and a process after step S150 is performed. On the other hand, when not satisfying the condition of $P_{reduced} \cdot P_{reduced} > 0$, the following processes are not performed and the process ends (S120).

If it is determined that the user terminal is the saving user terminal, a power scaling ratio S is calculated as follows (S160).

$$S = \frac{P_{reduced}}{P_k \cdot h_k} \quad \text{[Equation 4]}$$

where S is a multiplicative factor to control the radiated power of the base stations in the sectors that interfere with each other.

In other words, S is a factor that controls the signal strength of the adjacent base stations transmitting a signal having the dominant interference power $P_k$ based on the arrival power $P_{reduced}$.

Next, the user terminal informs the information, that is, information (e.g., ID of sector including corresponding base station) on the base station providing the dominant interference power and the interference information including the power scaling ratio according thereto to its own base station, that is, the serving base station (S170). Herein, the user terminal may transmit the interference information, which is included in channel quality information (CQI) that is used to determine transmission parameters (for example, data rate, code rate, modulation order, etc.).

Meanwhile, when the serving base station receives the interference information from the user terminal (S300), the interference information is transmitted to the neighboring sectors in which the source of the dominant interference exists, as shown in FIG. 3.

In other words, the power scaling ratio S included in the interference information is transmitted to the base stations included in the sector ID that is included in the interference information (S310).

As such, the process of transmitting the interference information to the base stations in the corresponding sector is performed according to the defined period or can be randomly performed.

Each base station receives at least one power scaling ratio from the neighboring sectors by the process of transmitting the interference information.

Of course, the serving base station also receives at least one power scaling ratio from the base stations in the neighboring sectors (S320).

The corresponding base station (of course, it may include the serving base station of the user terminal transmitting the interference information) receives at least one power scaling ratio from the adjacent base stations and than selects the power scaling ratio having the smallest value among at least one of the power scaling ratios received (S330).

Herein, the base station performs the following process when the user terminal on the transmission unit RUk, which performs the current scheduling and power allocation, is not the saving user terminal (S340). In the power control method according to the exemplary embodiment of the present invention, the saving user terminal is not excluded from the interference control object.

When the user terminal is the saving user terminal, it disregards the selected power scaling ratio and the process ends (S350). Meanwhile, the base station can receive information indicating a precondition that the user terminal on the transmission unit RUk performing the current scheduling and power allocation is not the saving user terminal, from the adjacent base stations.

The power scaling ratio having the smallest value is selected, and then whether to control the transmission power is determined based on the selected power scaling ratio. First, each of the throughput gain, which is a gain at the time of processing a signal at the selected power scaling ratio, and the throughput loss, which is a loss at the time of processing a signal at the selected power scaling ratio, is calculated (S360).

The throughput gain $TP_{gain}$ can be calculated by a product of the number Ns of signals having the selected power scaling ratio and the lowest ratio of the throughput gain, which can be represented as follows.

$$TP_{gain} = N_s \times f(\gamma_{target}) \quad \text{[Equation 5]}$$

where f( ) is a function that represents the SINR as the transmission ratio, and $\gamma_{target}$ represents the target SINR of the user terminal. The lowest ratio of the throughput gain represents the target SINR of the user terminal as the transmission ratio.

The throughput loss $TP_{loss}$ can be calculated as follows.

$$TP_{loss} = f[SINR(P_s)] - f[SINR(\min(S_1, \ldots S_{N_s}) \times P_s)] \quad \text{[Equation 6]}$$

In other words, the throughput loss $TP_{loss}$ is obtained by subtracting the transmission ratio at the time of controlling the signal power $P_s$ according to the selected power scaling ratio from the transmission ratio according to the signal power $P_s$.

When the power scaling ratio S is received from the worst user terminal on the current transmission unit RUk, it can be appreciated that the throughput loss $TP_{loss}$ will be "0" based on the above Equation 6.

As described above, the throughput gain $TP_{gain}$ and the throughput loss $TP_{loss}$ are each calculated and are then compared with the throughput threshold $TP_{th}$ that is a setting parameter to determine whether the following condition is satisfied (S370).

$$TP_{gain} - TP_{loss} \geq TP_{th} \quad \text{[Equation 7]}$$

In other words, it is determined whether the value obtained by subtracting the throughput loss $TP_{loss}$ from the throughput gain $TP_{gain}$ is larger than the throughput threshold value $TP_{th}$. When satisfying the condition, the base station controls the transmission power based on the selected power scaling ratio (S380). Therefore, the signal is transmitted based on the controlled transmission power, that is, the radiated power.

However, a separate power control is not performed when the value obtained by subtracting the throughput loss $TP_{loss}$ from the throughput gain $TP_{gain}$ is smaller than or equal to the throughput threshold value $TP_{th}$ (S350).

The power control method as described above is performed after the scheduling is performed, and may be performed for each transmission unit.

Meanwhile, the power control method for inter-cell interference removal according to the exemplary embodiment of the present invention can be further simplified if necessary.

First, only the user terminal determined as the saving user terminal does not transmit the interference information (the sector ID and the power scaling ratio of the base station providing the interference source) to the serving base station, but all cell edge users, which are scheduled by the serving base station, can transmit the interference information to the serving base station (first simplification scheme).

In this case, a process of determining whether the user terminal is the saving user terminal based on the SINR of the received signal from each user terminal and the arrival power $P_{reduced}$ based on the SINR is not performed, such that the power control method according to the exemplary embodiment of the present invention can be further simplified.

Second, the power scaling ratio S can be immediately set to "0".

The following processes are performed by setting the power scaling ratio to "0", not selecting a value satisfying the smallest transmission rate among the power scaling ratios.

In this case, the base station selecting the power scaling ratio of "0" is switched off to some degree.

Third, a process in which the base station calculates the throughput gain and the throughput loss and determines whether to apply the power scaling ratio based on the calculated throughput gain and throughput loss can be omitted.

In other words, the transmission power control can be performed based on the power scaling ratio immediately selected without performing the process (third simplification scheme).

The first simplification scheme generates more signals but can remarkably reduce the amount of calculations at the user terminal side.

Further, the second simplification scheme can maximally reduce quantification bits.

Therefore, the power control method for inter-cell interference removal according to the exemplary embodiment of the present invention can be implemented in four forms as follows according to applying the above simplification schemes.

1) The first form that performs the power control according to FIGS. 2 and 3 without applying the first to third simplification schemes.

2) The second form of applying the third simplification scheme while performing the power control according to FIGS. 2 and 3.

3) The third form of applying the second and third simplification schemes while performing the power control according to FIGS. 2 and 3.

4) The four form of applying the first to third simplification schemes while performing the power control according to FIGS. 2 and 3.

A person of ordinary skill in the art can easily implement applying at least one of the first to third simplification schemes to the power control method according to the exemplary embodiment of the present invention with reference to FIGS. 2 and 3 described above, and therefore the detailed description thereof will be omitted herein.

As described above, the power control method according to the exemplary embodiment of the present invention focuses on the improvement of the throughput for the cell edge user terminals by suppressing the main interference source, and the power control process is distributed and processed into a portion performed in the user terminal and a portion performed in the base station.

The scheduling is performed on the user terminal and the power scaling ratio is then calculated, which is fed back to the base station. The base station determines whether the power is reduced based on the received power scaling in order to reach the tradeoff between the performance of the cell edge and the performance of the entire cell, and determines the power reduction or not based on the throughput gain and the throughput loss.

As a result, according to the exemplary embodiment of the present invention, the throughput for the cell edge user terminal can be improved due to the throughput loss of the entire cell that is controllable.

In particular, the system performance for the cell edge user is improved while the total throughput performance loss of the cell is maintained at a proper level through the throughput gain and the cost calculation, such that the basic data transmission of the cell edge user is secured.

In order to implement the power control method for inter-cell interference removal according to the exemplary embodiment of the present invention as described above, a power control apparatus according to the exemplary embodiment of the present invention can be formed of the following structure.

Figure 4:
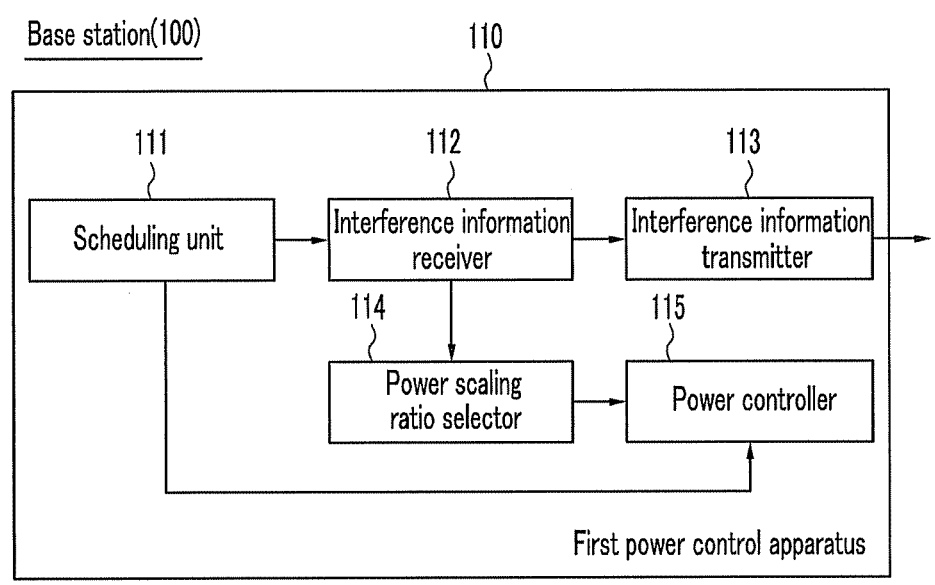
FIG. 4 is a diagram showing a configuration of the base station according to the exemplary embodiment of the present invention.
Figure 5:
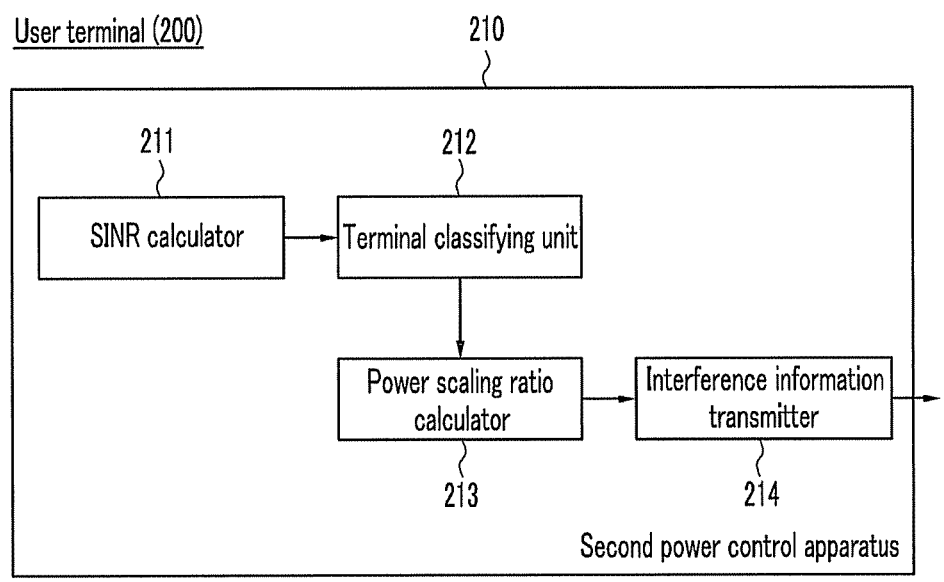
FIG. 5 is a diagram showing a configuration of the base station according to the exemplary embodiment of the present invention.

FIG. 4 is a diagram showing a configuration of the base station including a power control apparatus according to an exemplary embodiment of the present invention, and FIG. 5 is a diagram showing a configuration of a user terminal including the power control apparatus according to the exemplary embodiment of the present invention. Hereinafter, for convenience of explanation, the power control apparatus included in the base station is referred to as "a first power control apparatus" and the power control apparatus included in the user terminal is referred to as "a second power control apparatus".

As shown in FIG. 4, the first power control apparatus 110 included in the base station 100 includes a scheduling unit 111, an interference information receiver 112, an interference information transmitter 113, a power scaling ratio selector 114, and a power controller 115.

The scheduling unit 111 performs the scheduling on the user terminals for each transmission unit, and the interference information receiver 112 receives the interference information from at least one user terminal or receives the power scaling ratio from other base stations. The interference information transmitter 113 transmits the interference information from the at least one user terminal to the corresponding base station.

The power scaling ratio selector 114 transmits the power scaling ratio included in at least one interference information received to the power controller 115 and the power controller 115 performs the power control based on the power scaling ratio.

In addition, the second power control apparatus 210 included in the user terminal 200 includes an SINR calculator 211, a terminal classifying unit 212, a power scaling ratio calculator 213, and an interference information transmitter 214, as shown in FIG. 5.

The SINR calculator 211 calculates the SINR for the signal received from the base station, and the terminal classifying unit 212 calculates the arrival power based on the target SINR and determines whether the user terminal is the saving user terminal or the worst user terminal based on the calculated arrival power.

The power scaling ratio calculator 213 calculates the power scaling ratio for controlling the radiated power of the base stations. In this case, only when the user terminal is determined to be the saving user terminal can the power scaling ratio be calculated.

The interference information transmitter 214 transmits the interference information including the calculated power scaling ratio and the IDs of the sectors, which interfere with each other, to the serving base station.

The power control apparatuses having the above-mentioned structure according to the exemplary embodiment of the present invention are operated based on the power control method for inter-cell interference removal described above, and a person of an ordinary skill in the art can implement the operations of each power control apparatus based on the above-mentioned method, and therefore the detailed description of the operation of the power control apparatuses will be omitted.

As described above, results of simulating the power control method and apparatus for inter-cell interference according to the exemplary embodiment of the present invention can obtain the following results.

An environment performing simulation according to the exemplary embodiment of the present invention is as follows.

The simulation is performed in the sectored cellular OFDMA wireless communication system, and the user terminal and the base station uses a single antenna. However, the power control method according to the exemplary embodiment of the present invention is not limited to a single antenna using environment, and can be applied to a multi-antenna environment.

One cell includes 3 sectors having a directional antenna, and has a frame configuration of 802.16 m. An 8.75 MHz channel bandwidth can be reused in each sector, and a total bandwidth includes 864 used subcarriers. The user scheduling and the power control are performed for each transmission unit (RU), and the simulation result is performed on one transmission unit.

Exponential effective SIR mapping (EESM) is used to combine post-SINRs of each subcarrier to calculate an equivalent effective SINR of the transmission unit (RU), and a spatial correlated channel model (SCM) is applied. Round robin scheduling and proportional process scheduling are used, and in the case of the proportional process scheduling, an average window size is considered to be "100".

The threshold SINR $\gamma_{th}$ and the target SINR $\gamma_{target}$ are obtained from a block error rate (BLER) curved line and the threshold SINR $\gamma_{th}$ is set to a 0.5 BLER point of the MCS scheme having the lowest level. and the target SINR $\gamma_{target}$ is set to a 0.01 BLER point (target BLER) of the MCS scheme having the lowest level (target BLER). The threshold value throughput $TP_{th}$ is set to "0" that means the power control process is simply executed when the throughput gain $TP_{gain}$ is larger than the throughput loss $TP_{loss}$.

The basic parameters according to the simulation environment are shown in FIG. 6.

FIG. 6 is a diagram showing the parameters according to the simulation environment to which the power control method according to the exemplary embodiment of the present invention is applied.

Under the above-mentioned simulation environment, the result of comparing performance when performing the power control method for inter-cell interference removal according to the exemplary embodiment of the present invention is obtained as shown in FIGS. 7 to 10.

Figure 7:
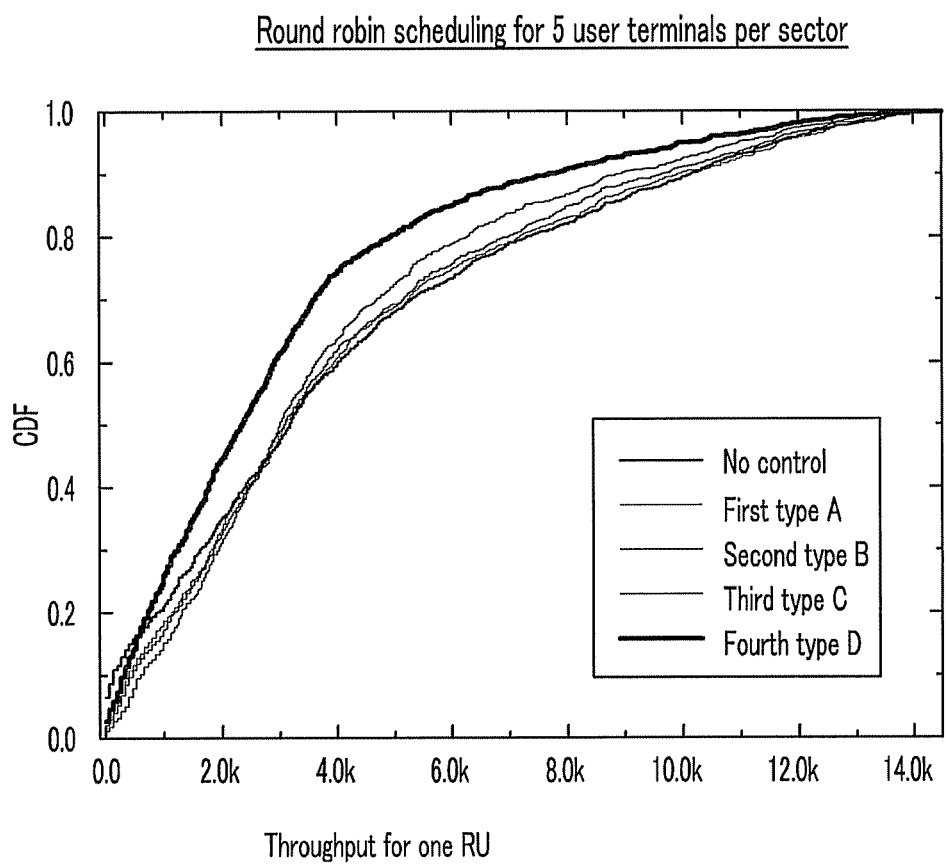
FIGS. 7 to 10 are graphs showing throughput performance by comparing the power control method according to the exemplary embodiment of the present invention with a case where the power control is not performed, while implementing the power control method according to the exemplary embodiment of the present invention in first to fourth types.
Figure 8:
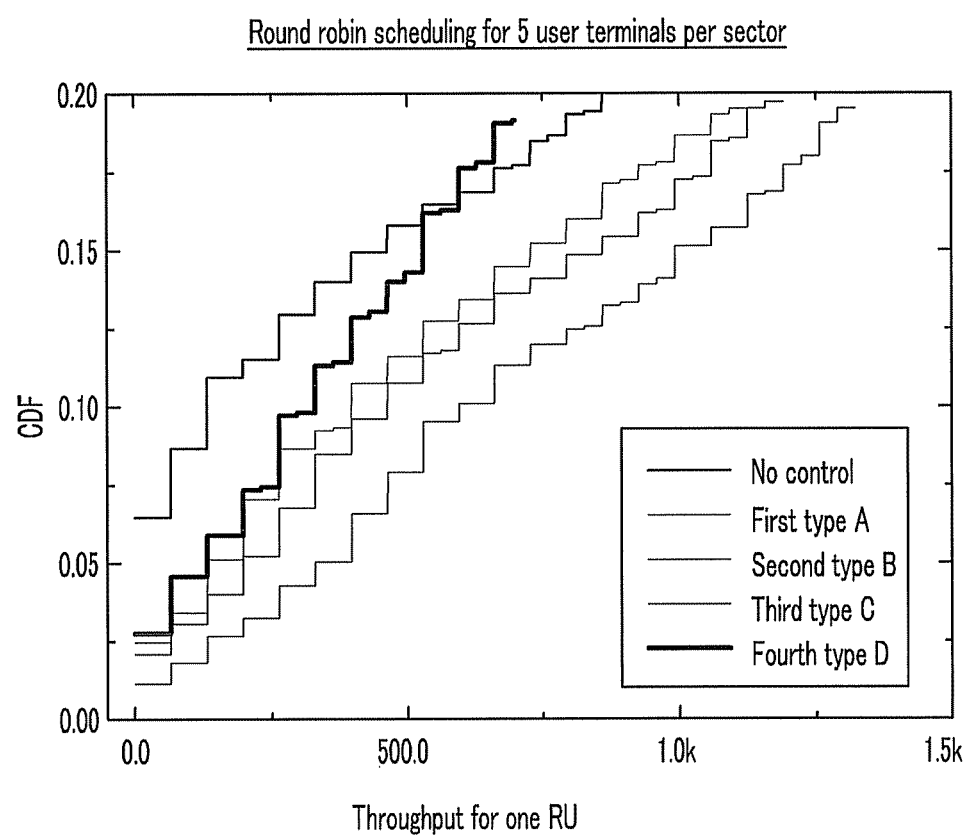
Figure 9:
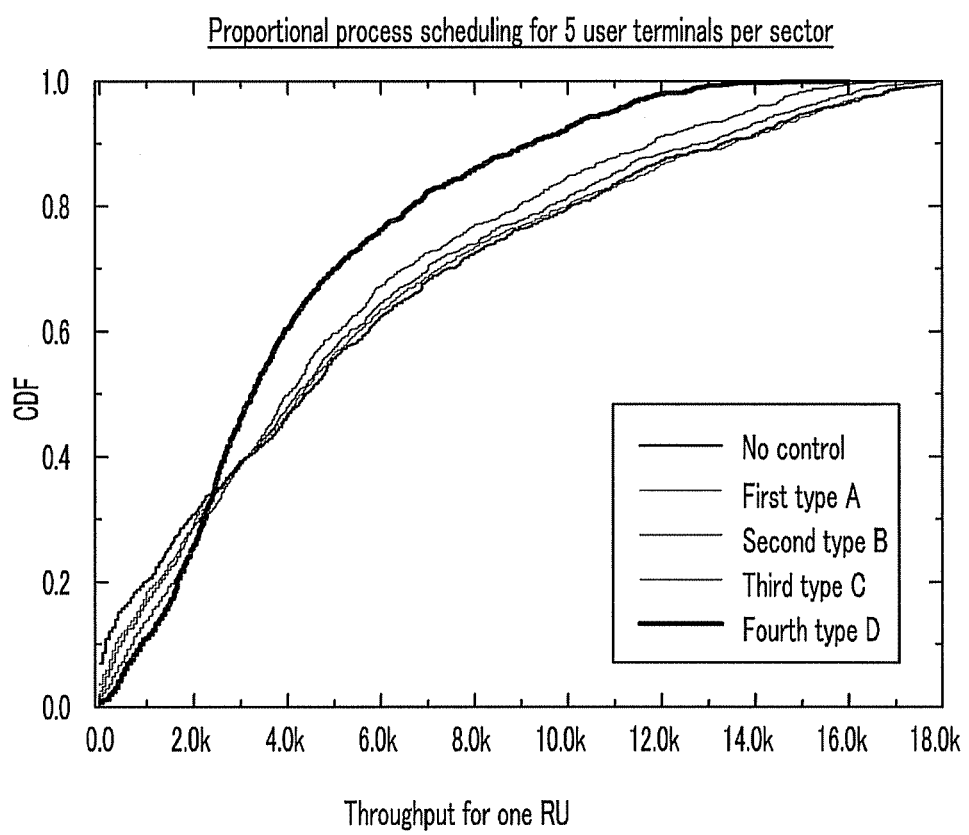
Figure 10:
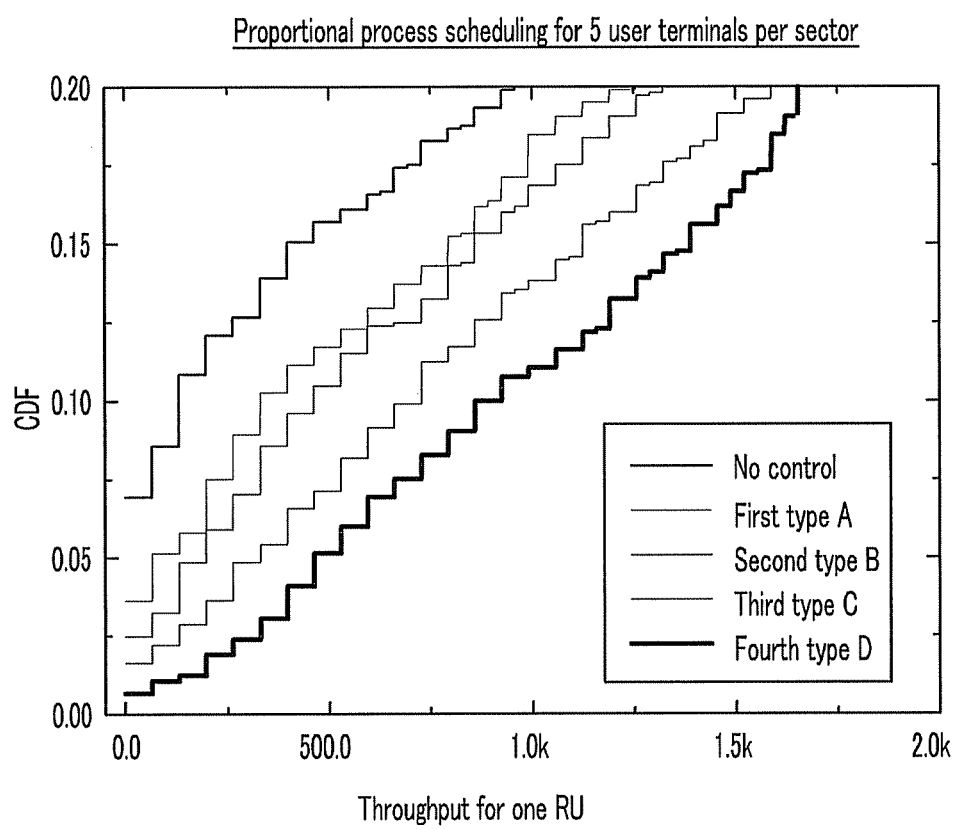

FIGS. 7 to 10 are graphs showing throughput performance by comparing the power control method according to the exemplary embodiment of the present invention with a case where the power control is not performed, while implementing the power control method according to the exemplary embodiment of the present invention in first to fourth types, respectively. In other words, FIGS. 7 and 8 are diagrams showing, as a cumulative density function (CDF) curved line, each throughput for the case the round robin scheduling is performed, and then the power control is not performed (no control) for the case of performing a first type (A) to which the first to third simplification schemes are not applied and the case of performing a second type (B), a third type (C), and a fourth type (D) to which at least one of the first to third simplification schemes are applied. In addition, FIGS. 9 and 10 are diagrams showing, as the CDF curved line, the throughput according to each case performed after performing the proportional process scheduling. In particular, FIG. 8 and FIG. 10 are enlarged diagrams of a box portion shown at the left of FIGS. 7 and 9.

Referring to FIGS. 8 and 10, when the power control method according to the exemplary embodiment of the present invention is implemented in the first to fourth types, it can be appreciated that much better throughput performance for the cell edge user terminal is shown as compared to the case that does not perform the power control. In particular, the power control methods in the first to fourth types according to the exemplary embodiment of the present invention disregard the user terminals of the cell center, and perform the power control focusing on the cell edge user terminal. From the first type to the third type, it can be appreciated that the throughput for the cell edge user terminal can be more improved. In the case of the fourth type using only the round robin scheduling, some worst user terminals feed back the power scaling ratio that does not improve the cell edge throughput while reducing the total throughput. However, in the case of the proportional process scheduling, since the user terminal is always selected at the peak of the channel change by the proportional process scheduling even when the fourth type is applied, the case where the worst user terminal feeds back the power scaling ratio is rarely generated such that it is much better than the case of the round robin scheduling.

Meanwhile, in FIG. 7 and FIG. 9, at the cell central portion corresponding to the upper portion, it can be appreciated that the CDF curved line in the first type is very close to the CDF curved line in the case where the control is not performed. On the other hand, it can be appreciated that the CDF curved lines in the second type, the third type, and the fourth type are further away from the CDF curved lines of the case where the control is not sequentially performed. This means that much more costs are essentially required according to the throughput for all the cells when the power is controlled in a more simplified scheme as going from the first type to the fourth type in order to increase the cell edge throughput.

Figure 11:
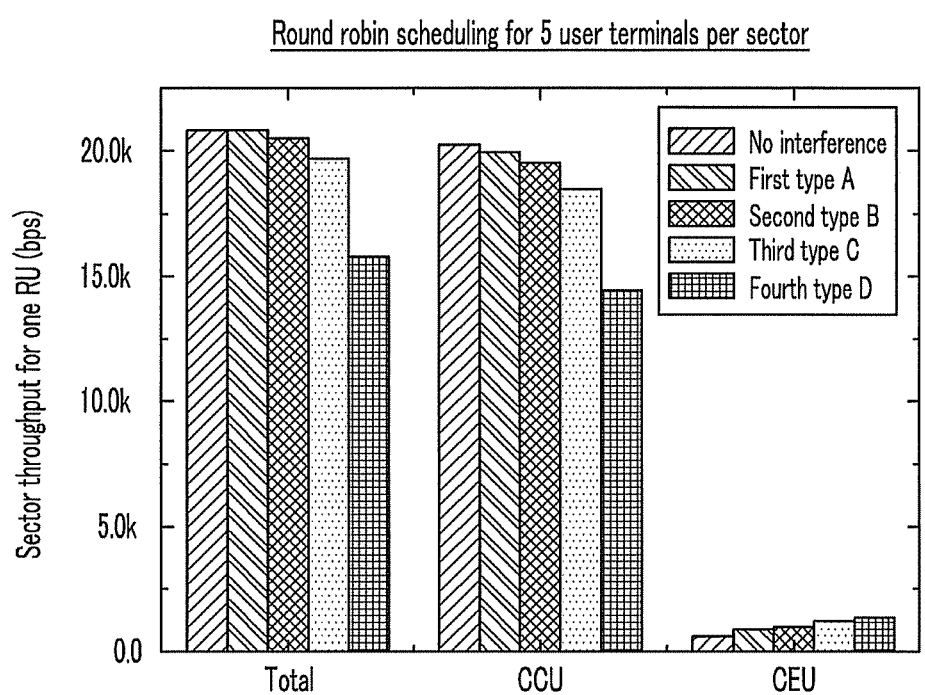
FIGS. 11 and 12 are diagrams showing results of simulating the throughput for a cell edge user terminal (CEU) and throughput for a cell center user (CCU) together with total average sector throughput.
Figure 12:
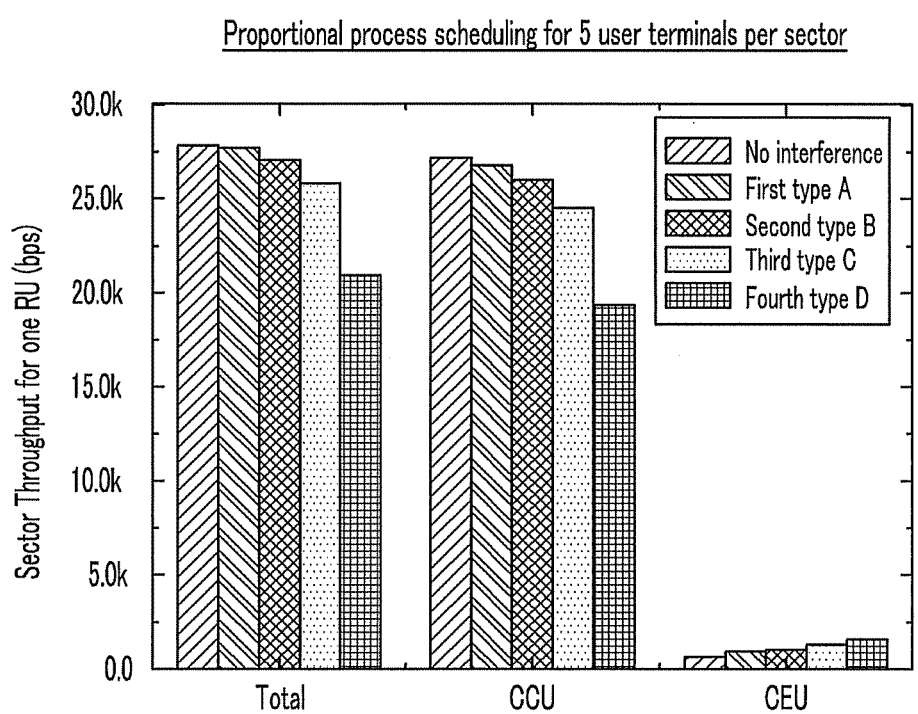

FIGS. 11 and 12 are graphs illustrating the total average sector throughput, and are diagrams showing results of simulating the throughput for a cell edge user terminal (CEU) and the throughput for a cell center user (CCU) together with total average sector throughput. Herein, an average post-SINR was used instead of an instantaneous post-SINR.

Referring to FIGS. 11 and 12, it can be appreciated that the unsimplified power control method in the first type according to the exemplary embodiment of the present invention provides an increase in throughput of about 50% with respect to the CEU, and it can be appreciated that the performance of the cell throughput of approximately the same sum can be maintained even though different scheduling schemes are used.

Meanwhile, when the power control methods in the second type, the third type, and the fourth type according to the exemplary embodiment of the present invention, respectively, are applied, the performance loss of a larger entire cell occurs due to the strict protection for the CEU, such that it can be appreciated that the tradeoff between the CEU and CCU performances is generated.

Comparison of relative statistical results of FIGS. 11 and 12 is shown in the following Table.

Table 1 shows the round robin scheduling scheme, and for each case of performing each power control method according to the first to fourth types according to the exemplary embodiment of the present invention, indicates the results of comparing the cell edge throughput with the total throughput.

TABLE 1

| Round Robin | First Type A | Second Type B | Third Type C | Fourth Type D |
|---|---|---|---|---|
| Cell edge throughput | +50% | +65.2% | +104.7 | +131.2% |
| Total throughput | −0.075% | −1.68% | −5.48% | −24.2% |

Table 2 shows the proportional process scheduling scheme, and for each case of performing each power control method according to the first to fourth types according to the exemplary embodiment of the present invention, indicates the results of comparing the cell edge throughput with the total throughput.

TABLE 2

| Proportional Process | Scheme A | Scheme B | Scheme C | Scheme D |
|---|---|---|---|---|
| Cell edge throughput | +41.89% | +56.74% | +95.76% | +137.06% |
| Total throughput | −0.5% | −2.85% | −7.27% | −24.84% |

The parameters used according to the exemplary embodiment of the present invention can be changed according to the system having various necessary conditions, and the performance of the power control methods according to the first to fourth types by the simulation can be changed according to the amount of signaling information required between the calculation amount at the user terminal and the sectors of the base station.

According to an exemplary embodiment of the present invention, the source that generates the inter-cell interference in the downlink of the wireless communication system can be suppressed, and the throughput performance of the cell edge users can be further improve. In particular, it can maintain the throughput loss of the entire cell at a proper level through the throughput gain and the cost calculation, and therefore improve the system performance of the cell edge, thereby making it possible to secure the basic data transmission rate of the cell edge users.

The above-mentioned exemplary embodiments of the present invention are not embodied only by a method and apparatus. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power control method of a signal transmitted to a user terminal by a base stations in a multi-cell environment that includes a plurality of cells each of which is divided into a plurality of sectors, comprising:
receiving interference information from a user terminal, the interference information including information that is calculated based on power of interference by an neighboring sector to indicate how much a base station in an neighboring sector, which interfers with each other, reduces transmission power;
transmitting the received interference information to the corresponding neighboring sector; and
when receiving interference information from the neighboring sector, controlling power of a signal transmitted to the user terminal based on the interference information,
wherein the interference information includes an ID of the neighboring sector and a power scaling ratio that indicates how much signal power of the neighboring sector is reduced.

2. The power control method of claim 1, wherein the controlling power includes:
calculating a throughput gain and a throughput loss, respectively, when the signal power is controlled based on the power scaling ratio;
determining whether or not to control the signal power based on the calculated throughput gain and throughput loss; and
if it is determined that the signal power is controlled, reducing the signal power based on the power scaling ratio.

3. The power control method of claim 2, wherein the determining
determines that the signal power is controlled when a value obtained by subtracting the throughput loss from the throughput gain is larger than or equal to a threshold throughput set to determine the control or not.

4. The power control method of claim 1, wherein the controlling power includes:
when receiving at least one power scaling ratio from neighboring sectors, selecting a power scaling ratio having the smallest value among the received power scaling ratios; and
controlling the power of the signal transmitted to the user terminal based on the selected power scaling ratio.

5. The power control method of claim 1, wherein the controlling the power includes:
when receiving at least one power scaling ratio from the neighboring sectors, setting a power scaling ratio for controlling the signal power to "0"; and
controlling the power of the signals transmitted to the user terminals based on the set power scaling ratio.

6. The power control method of 1, wherein the power control method is performed after the base station performs scheduling of the user terminal.

7. The power control method of claim 6, wherein the base station receives the interference information from all the user terminals that are subjected to the scheduling.

8. The power control method of claim 6, wherein the base station receives the interference information from a user terminal determined as a saving user terminal among the user terminals that are subjected to the scheduling.

9. A power control method of signals transmitted from base stations by user terminals in a multi-cell environment that includes a plurality of cells each of which is divided into a plurality of sectors, comprising:
calculating a signal to interference and noise ratio of signals received from a base station of an adjacent sector by the user terminal;
calculating arrival power to be reduced based on the calculated signal to interference and noise ratio so that the interference power of the interference signal arrives at the set target signal to interference and noise ratio;

generating the interference information that indicates how much the base station in the neighboring sector corresponding to the interference signal reduce the transmission power, based on the calculated arrival power; and transmitting the interference information to a serving base station.

10. The power control method of claim 9, wherein the calculating the arrival power includes calculating the arrival power when the calculated signal to interference and noise ratio is smaller than a predetermined threshold signal to interference and noise ratio.

11. The power control method of claim 9, further comprising determining whether the user terminal is a worst user terminal that cannot reach the target signal to interference and noise ratio even though the user terminal reduces the interference power or whether the user terminal is a saving user terminal that can reach the target signal to interference and noise ratio by reducing the interference power, based on the calculated arrival power.

12. The power control method of claim 11, wherein the determining includes determining that the calculated arrival power is calculated by an operation that sets a negative value to "0" and when a square of the calculated arrival power is 0, the user terminal is the worst user terminal, and determining that the user terminal is the saving user terminal when the square of the calculated arrival power is not "0".

13. The power control method of claim 11, wherein, if it is determined that the user terminal is the saving user terminal, the user terminal generates the interference information and transmits the generated interference information to the serving base station.

14. A power control apparatus of signals of the base station transmitted to user terminals in a multi-cell environment that includes a plurality of cells each of which is divided into a plurality of sectors, comprising:

an interference information receiver that receives interference information from a user terminal or an neighboring sector, the interference information including the power scaling ratio that is calculated based on power of interference by the neighboring sector to indicate how much a base station in an neighboring sector, which interferes with each other, reduces transmission power;

an interference information transmitter that transmits the interference information received from the user terminal to the corresponding neighboring sector;

a power scaling ratio calculator that calculates throughput gain and throughput loss, respectively, based on the power scaling ratio received from the neighboring sector, and determines whether the signal power is controlled based on the calculated throughput gain and throughput loss; and a power controller that reduces the signal power based on the power scaling ratio if it is determined that the signal power is controlled.

15. The power control apparatus of claim 14, wherein when receiving at least one power scaling ratio from neighboring sectors, the power scaling ratio calculator selects the power scaling ratio having the smallest value among the received power scaling ratios.

16. The power control apparatus of claim 14, wherein the power control apparatus receives the interference information from a user terminal determined by a saving user terminal that reaches the target signal to interference and noise ratio by reducing the power of the interference signal.

17. A power control apparatus of user terminals to control power of signals transmitted by base stations in a multi-cell environment that includes a plurality of cells each of which is divided into a plurality of sectors, comprising:

a signal to interference and noise ratio calculator that calculates a signal to interference and noise ratio of a signal received from a base station;

a power scaling ratio calculator that determines the interference signal based on the calculated signal to interference and noise ratio and calculates a power scaling ratio that indicates how much the base stations in an neighboring sector corresponding to the interference signal reduce the transmission power; and an interference information transmitter that transmits the interference information including the calculated power scaling ratio and the IDs of the corresponding neighboring sector to a serving base station.

18. The power control apparatus of claim 17, further comprising a terminal classifying unit that calculates arrival power to be reduced based on the calculated signal to interference and noise ratio so that the interference power of the interference signal reaches the set target signal to interference and noise ratio and determines whether the corresponding user terminal is a saving terminal that can be saved from the interference signal based on the calculated arrival power.

19. The power control apparatus of claim 18, wherein the power scaling ratio is a value that is calculated by dividing the arrival power by the power of the interference signal.

* * * * *